United States Patent [11] 3,566,205

[72] Inventors John Siddall Walker Colmworth; Michael Rupert Platten Young, Turvey; Gordon Howard Littlejohn, Bedford; Ian Hambry Morgan, Eaton Socon, St. Neots, England

[21] Appl. No. 656,534
[22] Filed July 27, 1967
[45] Patented Feb. 23, 1971
[73] Assignee Texas Instruments Incorporated Dallas, Tex.
[32] Priority July 29, 1966
[33] Great Britain
[31] 34,239

[54] PACKAGED HIGH FREQUENCY TRANSISTOR WITH DIRECTLY FUSED CONTACTS

5 Claims, 13 Drawing Figs.

[52] U.S. Cl. .......... 317/234, 317/235, 29/589, 27/591
[51] Int. Cl. .......... H01l 5/00, H01l 3/00
[50] Field of Search .......... 317/234, 235, 40, 40.1, 40.13, 3, 3.1, 5, 5.3, 5.4

[56] References Cited

UNITED STATES PATENTS

| | | | |
|---|---|---|---|
| 2,721,965 | 10/1955 | Hall | 317/235 |
| 3,030,562 | 4/1962 | Maiden et al. | 317/235 |
| 3,212,162 | 10/1965 | Moore | 29/25.3 |
| 3,225,261 | 12/1965 | Wolf | 317/101 |
| 3,274,667 | 9/1966 | Siebertz | 29/155.5 |
| 3,287,610 | 11/1966 | Reber | 317/234 |
| 3,290,570 | 12/1966 | Cunningham et al. | 317/240 |
| 3,309,585 | 3/1967 | Forrest | 317/234 |
| 3,306,508 | 8/1967 | Prletz et al. | 317/101 |
| 3,358,197 | 12/1967 | Scarlett | 317/235 |
| 3,453,503 | 7/1969 | Schulz et al. | 317/235 |

*Primary Examiner*—John W. Huckert
*Assistant Examiner*—B. Estrin
*Attorneys*—Samuel M. Mims, Jr., James O. Dixon, Andrew M. Hassell, Harold Levine, Melvin Sharp, Gerald B. Epstein, John E. Vandigriff, Stevens, Davis, Miller and Mosher

ABSTRACT: A transistor suitable for use in the U.H.F. band and capable of providing power amplification. The transistor incorporates terminations that are directly fused, e.g. in soldering or brazing to respective emitter, base and collector contact surfaces having relatively large areas. In one embodiment the base region is a circular annulus in which are diffused emitter regions spaced around the annulus. The emitter contact is an annulus having radially inward projecting fingers overlying the emitter regions and the base contact is a disc having radially outward projecting fingers interdigitating with the emitter contact fingers. The base and collector terminals have coaxial stems projecting from discs fused to the base and collector contacts and the emitter terminal is an annulus fused to the emitter contact. This provides a package suitable for incorporation into a coaxial line system. Other embodiments incorporate rectangular, platelike terminations and provide packages suitable for direct incorporation into strip line and rectangular waveguide systems.

PACKAGED HIGH FREQUENCY TRANSISTOR WITH DIRECTLY FUSED CONTACTS

Figures 1, 2, 3:
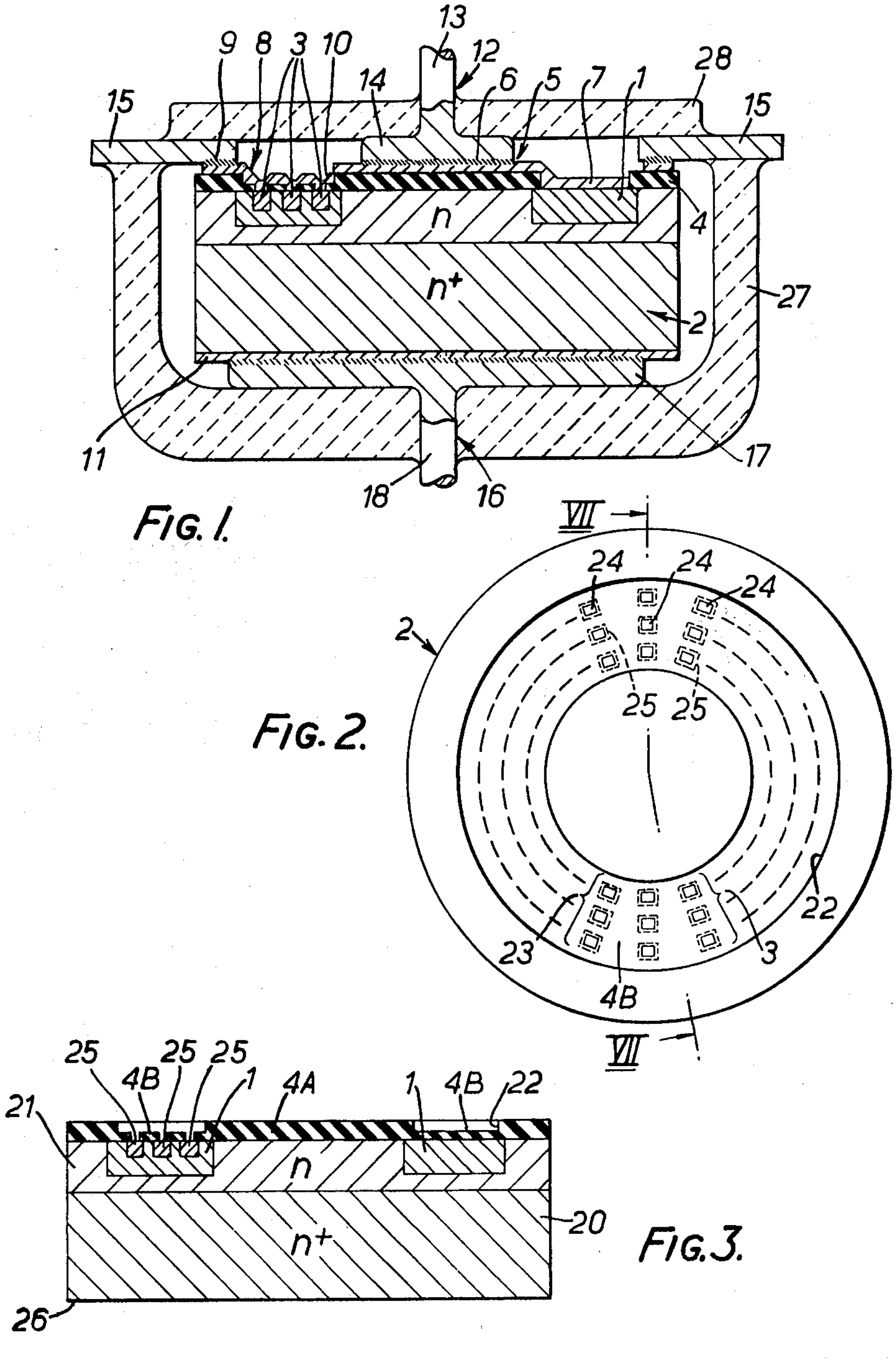

This invention relates to semiconductor devices and in particular to transistors suitable for use at high frequencies, e.g. in the U.H.F. band.

The design of transistors for operation at U.H.F. frequencies presents a number of problems. For example, it is necessary that the terminal lead impedances shall be small and especially that lead inductance be a minimum and preferably there should be a high degree of compatibility between the transistor package and the circuit of which it is to form a part, both from the mechanical and electrical design aspects. If the transistor is required to dissipate relatively large amounts of power, then the problems are intensified. The transistor package should have a low thermal resistance and there should be a low resistance thermal path between the transistor wafer and the ambient surroundings. Attempts to reduce the overall transistor temperature by reducing the current density through it at any given power level have been made by using interdigitated base and emitter regions with expanded ohmic contacts to these respective regions. The ohmic contacts normally are connected to terminals by wires bonded, as by welding, at one end to a contact region and at the other end to a terminal. This type of approach has been only partially successful since local heating resulting from the relatively small amount of heat conducted laterally across the transistor wafer compared with the amount conducted through the wafer to the package, and from local variations in the base emitter current, tends to result in undesirably large temperature variations across the wafer. Apart from these problems, there is the necessity to provide relatively large surface contact areas in order to carry large *r.f.* currents (which can be of the order of amperes) and the need to minimize skin effect losses.

The present invention is concerned with the provision of a semiconductor device in which at least some of the above problems can be reduced.

In order to reduce the DC resistances and *r.f.* impedances in the electrical paths between the electrical leads and the active region of the device, this present invention provides a semiconductor device including a body of semiconductor material having active regions exposed at one or more faces of the body, low resistance contacts ohmically overlying and attached to respective active regions, and electrical terminal members having regions overlying and fused directly to the respective contacts and extending in sealed relationship through a package containing the semiconductor body. In order to maximize the advantages to be derived from the invention, the contiguous region of the contact and terminal members should be relatively large in area, and preferably be planar surfaces, e.g. disc—or platelike areas. The contact can be attached to the active regions directly or through regions of the semiconductor body.

Preferably, the contacts can be composed of two deposited layers, one layer, deposited on to the appropriate surface region of the semiconductor body, having a thermal coefficient of expansion compatible with that of the semiconductor material, and the other layer being a good electrical conductor e.g. a precious metal. The terminal members then are preferably composed of a good electrical conductor e.g. copper plated with a precious metal. Desirably, the plating of the terminal members and the overlying layer of the contacts are formed of the same precious metal, e.g. gold, and their contiguous surfaces are fused using a solder containing that precious metal e.g. a gold-indium or gold-germanium solder.

By use of the invention, semiconductor devices suitable for direct connection into a transmission line, e.g.coaxial, strip line or rectangular waveguide, can readily be manufactured. For example, a semiconductor device for incorporation into a coaxial system may have disclike contacts on opposite faces of the semiconductor body and the electrical terminals can then include coaxial stems attached to discs fused directly to the contact discs. The body can also include an annular contact area to which an annular contact, projecting through the package transversely of the stems of the other two terminals, is directly fused. A device suitable for incorporation into a strip line system can include platelike contact areas, on the same or on opposite sides of the semiconductor body, to which platelike terminal members are directly fused; this type of construction can also be employed when the semiconductor device is to be incorporated into a rectangular wave guide system.

In one embodiment of the present invention, a transistor device includes a wafer or dice of semiconductor material in a first surface of which is formed a base region, discrete emitter regions formed at spaced intervals in the base region, an expanded ohmic emitter contact having projecting fingers overlying the emitter regions and electrically connected only to the emitter regions, an expanded ohmic base contact having projecting fingers overlying and electrically contacting areas of the base region disposed between the spaced emitter regions, an ohmic collector contact formed on the surface of the wafer or dice opposite the first surface, and electrical terminations having plane surface areas overlying and fused directly to areas of the emitter, base and collector contacts.

More particularly, a transistor device particularly suitable for use at high frequencies and embodying the invention, includes a wafer or dice of semiconductor material in a first surface of which is formed a base region extending around a closed path, discrete emitter regions formed in the base region at spaced intervals around the closed path, an ohmic emitter contact having a region surrounding the closed path with fingers projecting from it which overlie the respective emitter regions, the emitter contact being electrically connected only to the emitter regions of the wafer, an ohmic base contact having a region surrounded by the said closed path with fingers projecting from it which overlie areas of the base region disposed between the spaced emitter regions, an ohmic collector contact formed on the surface of the wafer opposite the said first surface, and electrical terminations having plane surfaces directly fused to the respective emitter, base and collector contacts. Preferably, the plane surfaces of the electrical terminations are fused to the contacts over substantially the whole of their overlying areas.

In a preferred form of embodiment suitable for use in a coaxial system, the base and collector terminal connections have disclike portions which are directly fused to the base and collector contacts, respectively, over the whole of their overlying areas and terminal leads or studs project coaxially with each other from the base portions perpendicularly to the wafer surfaces. The emitter terminal connection then advantageously can be ringlike and fused to the emitter contact region surrounding the closed path of the base region, the emitter terminal connection extending along the surface and projecting beyond the edge of the wafer. Such a terminal configuration permits the transistor to be readily connected in a coaxial system, such as may be used in the U.H.F. band, thus ensuring a high degree of compatibility with the circuit of which it forms part. In addition, terminal lead impedance and inductance are minimized since the terminal connections are directly to the contact areas of the active regions of the transistor, connecting wires between the terminals and to active areas not being required. The base and collector terminals also have very low capacitive coupling. By use of compatible materials for the contacts to the active region of the transistor, the electrical terminations and the material used to fuse the terminations to the contacts, skin effect losses can be reduced to an acceptably low level. For example, the contacts might be formed of superposed layers of molybdenum and gold, the electrical terminations of gold plated copper and the terminations fused to the contacts by a gold-germanium or a gold-indium solder. The particular emitter terminal configuration described permits the emitter contact to be grounded to high frequencies in a convenient manner and provides a low resistance thermal path for heat transmission from the transistor wafer. The base and collector terminals, which have relatively large areas fused directly to the base and collector contacts, also provide for enhanced thermal transmission from the wafer.

Figure 4:
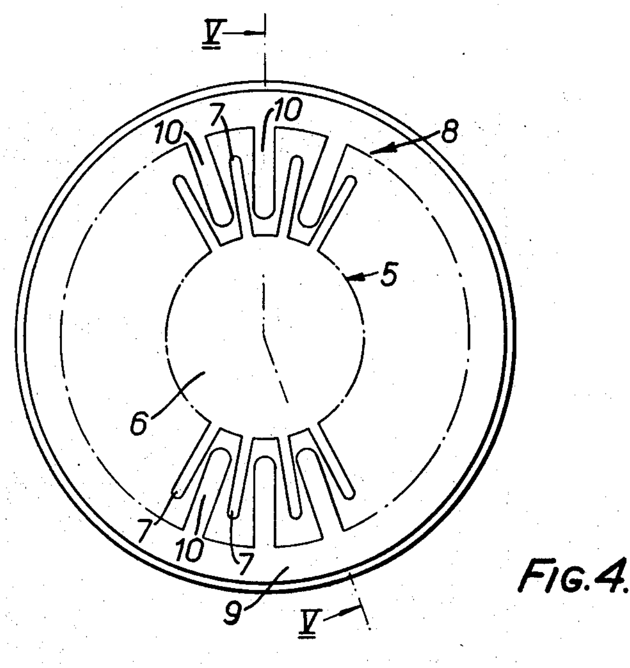
Figure 5:
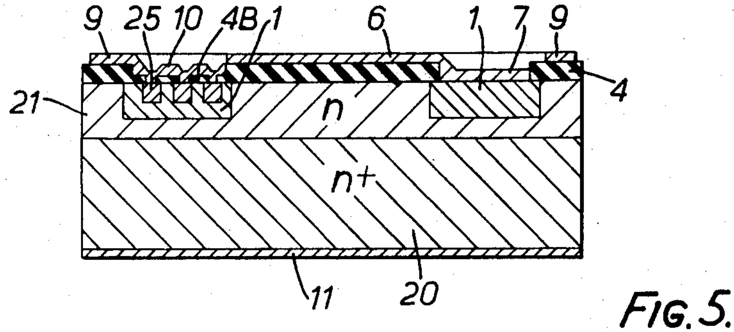
Figure 6:
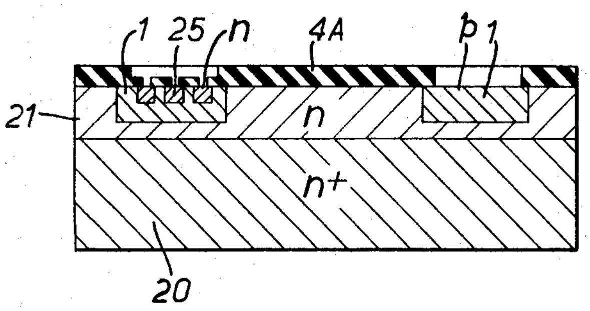
Figure 7:
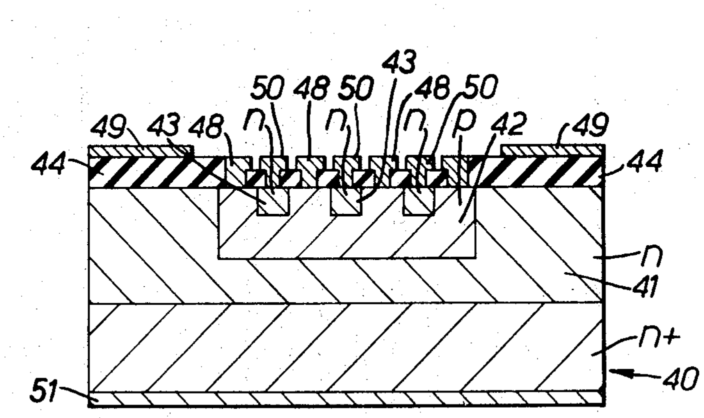
Figure 8:
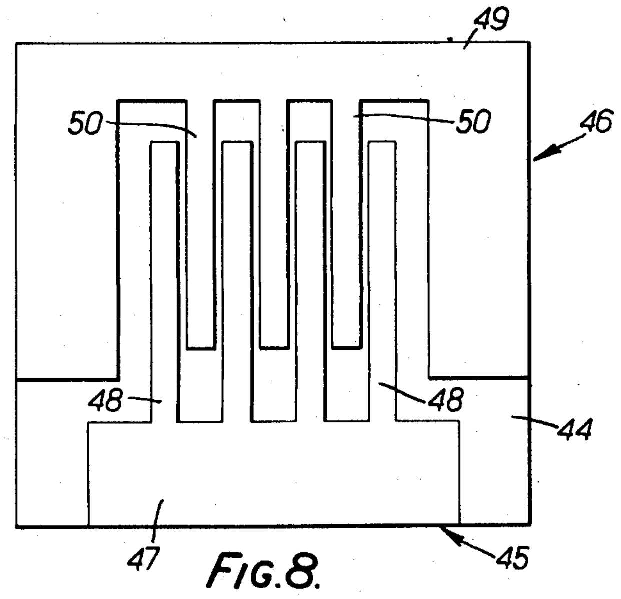
Figure 9:
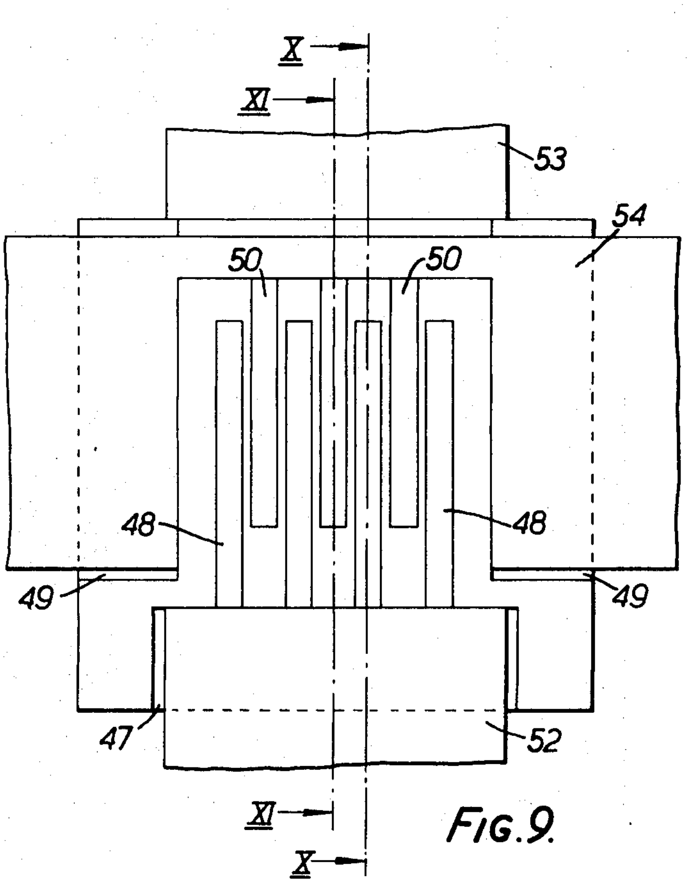
Figure 10:
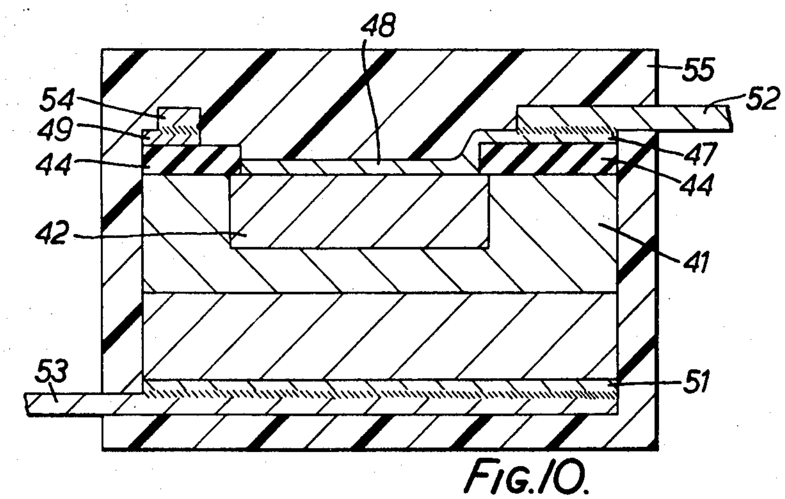
Figure 11:
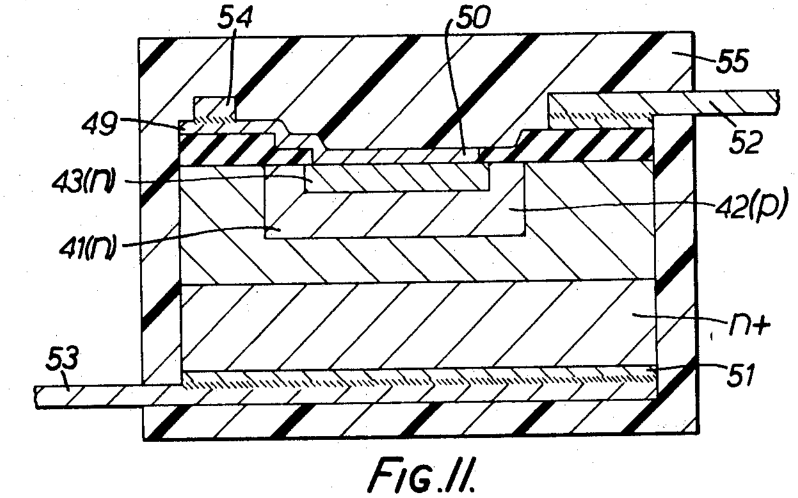
Figure 12:
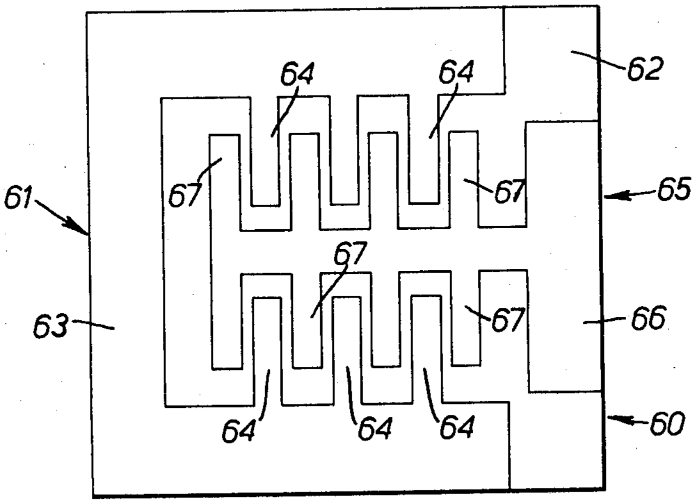
Figure 13:
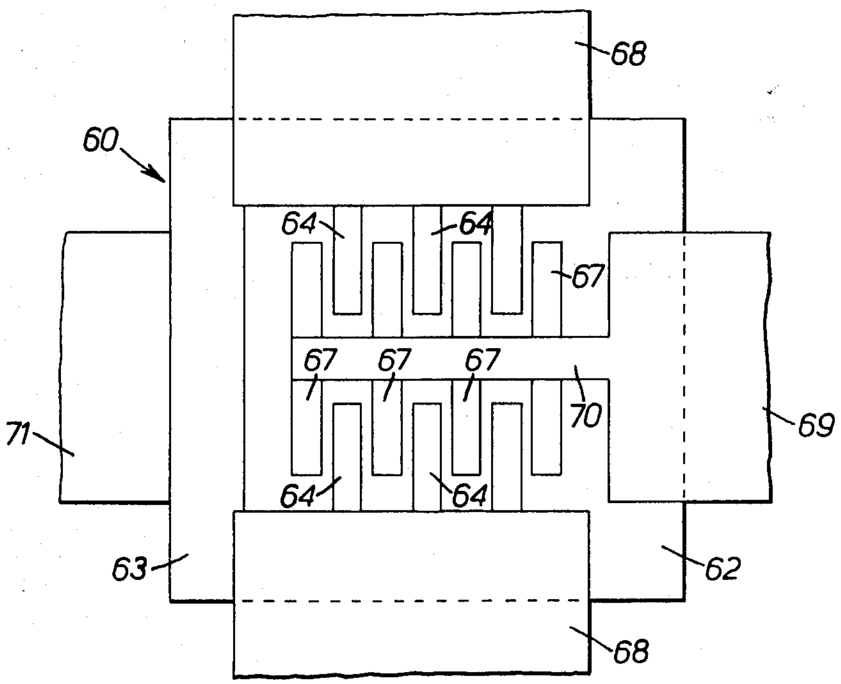

By way of example, the invention will be described in greater detail with reference to the accompanying drawings, of which:

FIG. 1 is a sectional view of a transistor embodying the invention,

FIGS. 2 and 4 are top plan views of the semiconductor wafer shown in FIG. 1 at different stages during manufacture of the transistor, FIGS. 3 and 5 are sections on the lines III–III and V–V in FIGS. 2 and 4, FIG. 6 is a section similar to FIG. 3 showing a stage intermediate that shown in FIGS. 2 and 4, FIG. 7 is a sectional view of another transistor embodying the invention at a stage during manufacture, FIG. 8 is a top plan view of FIG. 7, FIG. 9 is a top plan view of FIG. 7 at a later stage of manufacture, FIGS. 10 and 11 are sections on the lines X–X and XI–XI in FIG. 9 at a still later stage of manufacture, and FIGS. 12 and 13 are top plan views of another embodiment at different stages of manufacture.

The drawings are on a considerably enlarged scale and various portions are not to scale relative to each other, certain parts having been exaggerated in size and shape for the purposes of adequate illustration.

The transistor illustrated diagrammatically in FIG. 1 is an N.P.N. silicon power transistor suitable for use in the U.H.F. band. The transistor has an annular base region 1 formed in the top surface, as seen in FIG. 1, of a circular silicon wafer or dice 2 and radially extending emitter regions 3, only one of which is seen in FIG. 1, formed in and spaced around the base region. An insulating layer 4, for example a silicon oxide layer, covers the top surface of the wafer except for areas of the base and emitter regions to which electrical connections are to be made. These electrical connections are formed by deposited contacts, the base contact 5 having a central dislike area 6 disposed within the confines of the annular base region 1 with fingers 7 projecting radially outwards from the central region 6 and making contact with the exposed area of the base region 1 between adjacent emitter regions 3. The emitter contact 8 has an outer annulus or ring 9 which surrounds the base region 2 with fingers 10 projecting inwardly from the ring 9. The fingers 10 interdigitate with the base contact fingers 7, overlying and contacting the emitter regions 3. A disclike collector contact 11 is also formed on the under surface of the wafer 1.

Terminal connections, or leadouts, are secured directly to the contact areas by fused joints, e.g. soldering or brazing. The base terminal 12 is a relatively stiff wire or stud 13 extending from a disc 14 directly fused to the central area 6 of the base contact over the whole of their overlying areas. The emitter terminal is a flat ring 15 directly fused to the ring 9 of the emitter contact over the whole of their overlying areas and projecting radially outwards from the edge of the wafer 2. The collector terminal 16 is shaped similarly to the base terminal and has a disc 17 directly fused to the contact 11 over the whole of their overlying areas. A relatively stiff wire or stud 18 extends from the disc 17 and is disposed coaxially with the base terminal wire or stud 13. This terminal, or leadout, disposition permits ready connection of the transistor in a U.H.F. coaxial line circuit and ensures a high degree of mechanical and electrical compatibility between the transistor and the circuit.

The device just described can be manufactured in the following manner, which will be described with reference to FIGS. 1—6. Referring to FIGS. 2—4, the circular silicon wafer 2 has a body portion 20 of $n+$ doped material on the top surface of which has been epitaxially deposited an $n$-type layer 21. A silicon oxide layer 4A is formed, e.g. by thermal growth or deposition, over the layer 21, initially covering the whole surface of the layer 21. Then, using photographic masking and etching techniques an annular window 22 is formed in the oxide layer 4A to expose part of the $n$-type layer 21. The annular base region 1 then is formed by diffusing $p$-type dopant material into the portion of the $n$-type layer 21 exposed by the window 22.

Next another silicon oxide layer 4B is formed over the existing layer 4A and the diffused base region 1 and using photographic masking and etching techniques, groups of rectangular windows 23 are formed in the oxide layer 4B where it overlies the base region 1, the groups 23 being located at regular intervals around the base region and each group comprising three radially spaced windows 24. N-type dopant material then is diffused in to the portions of the base region 1 exposed by the windows 24 to form the emitter regions 3, each emitter region comprising three radially spaced areas 25. A further etching step is used to remove radially extending areas of the oxide layer 4B between adjacent emitter regions 3 to expose the underlying base region 1 in those areas, as shown on the right-hand side of FIG. 6.

At this stage of manufacture, the wafer 2 has a top surface covered by the insulating layer 4 except in exposed areas of the emitter regions 3 and intervening exposed areas of the base region 1. The bottom surface 26 of the wafer is completely exposed at this stage. The base emitter and collector contacts 5, 8 and 11 are next formed by evaporating firstly molybdenum and then gold layers over the whole of the top and bottom surfaces of the wafer 2. Then using photographic masking and etching techniques, portions of the metallic layers are removed from the top surface of the wafer to leave the base contact 5 (the disclike central area 6 of which and its radially outwardly projecting fingers 7 are clearly seen in FIG. 4) and the emitter contact 8 (the outer ring 9 of which and its radially inwardly projecting fingers 10 also being clearly seen in FIG. 4). The disclike region 6 of the base contact is surrounded by the annular base region 1 and the ring 9 of the emitter contact surrounds the base region 1. The fingers 7 of the base contact interdigitate with and are spaced from the emitter contact fingers 10, the latter being insulated from areas of the base region between the areas 25 of each emitter group by the underlying portions of the insulating layer 4B.

After preparation of the thus processed wafer 2, the base, emitter and collector terminals 13, 15 and 16 are fused directly to the respective contact regions 6, 9 and 11. Suitably, the terminals 13, 15 and 16 can be made of gold plated copper and fused to the respective contact regions 6, 9 and 11 using a gold-indium or gold-gernamium solder. Use of such compatible materials serves to reduce skin effect losses to a minimum. The fabrication of device can be completed by encapsulating it in a package shown, by way of example, as having a glass or ceramic cup-shaped portion 27 and a lid 28 fused to the terminal connections 13, 15 and 16 to form a hermetically sealed package. Alternatively, the cup and lid could be replaced by a glass or ceramic cylinder having lids fused to it at either end. In a further alternative construction, a disclike preform of glass or ceramic to which the emitter and base terminals are sealed and another disclike preform to which the collector terminal is sealed could be used in conjunction with a glass or ceramic cylinder, the seal being completed by fusion of the disclike preforms to the cylinder. Instead of using a glass or ceramic enclosure to package the device, the device might be encapsulated or potted in suitable plastics material. The package, however, is not an essential feature of the invention and detailed description hence has not been given.

From the description of the above embodiment, it will be seen that the coaxial base and collector terminals permit connection of the device directly into a coaxial line or strip line structure, the electrical connections providing adequate mechanical support for the device and the projecting ringlike emitter terminal facilitating use of the device in a grounded emitter configuration with the extended area connections between the contacts and terminals (particularly of the emitter) aiding transfer of heat from the wafer. From an electrical point of view, the terminal lead inductances can be made very small, skin effect losses minimized and the base and collector terminals provide low capacitance couplings. As previously mentioned, difficulties associated with bonding terminals to contacts using discrete welded joints are avoided due to the terminals being fused directly to the respective contacts over relatively large areas. All these features combine to make the device particularly suitable for power amplification at high frequencies and especially in the U.H.F. band.

The above-described embodiment is capable of modification both as regards structure and manner of manufacture. For example, the emitter regions 3 have been shown in the form of radially extending, spaced discrete areas 25. In one alternative embodiment, each emitter region could be in the form of a continuous radial stripe. Again, the wafer 2 has been described as having a circular shape, but polygonal shapes, e.g. hexagonal or octagonal, might sometimes be preferable with corresponding change in shape of the base region if desired.

The transistor shown in FIGS. 7—11 is an NPN power transistor comprising an *n*+—type silicon wafer 40 including an *n*-type epitaxially deposited silicon layer 41 forming the collector region of the transistor. The transistor also includes a *p*-type base region 42 in which are diffused *n*-type emitter stripes 43. As thus far described, the manufacturing process can be quite conventional and since it is not directly concerned with the present invention will not be described in greater detail.

As shown in FIG. 7 an insulated layer 44, for example an oxide of silicon layer, covers the top surface of the wafer 40 except for areas of the base and emitter regions to which electrical connections are made. These electrical connections are made by deposited contacts 45 and 46.

The base contact 45 has a platelike portion 47, extending adjacent one edge of the wafer 40 and overlying part of the insulating layer 44, with spaced apart fingers 48 extending from the portion 47 over the base region 42 with which electrical contact is made through appropriate openings in the insulating layer 44. It will be seen from FIG. 7 that the fingers 48 contact the base region on either side of the emitter stripes 43. The emitter contact 46 has a C-shaped portion 49 deposited on the insulating layer 44 adjacent the edges of the other three sides of the wafer 40 and fingers 50 extend from the arm of the C. The fingers 50 overlie and make contact with the emitter stripes 43 through appropriate apertures in the insulating layer 44 and interdigitate with, but are spaced from, the fingers 48 of the base contact. Thus the insulating layer 44 serves to mark the surface exposed junctions between the emitter, base and collector regions and also to ensure that the base and emitter contacts are electrically connected only to the respective base and emitter regions.

The bottom surface of the wafer 40 has a collector contact 51, in the form of a plate covering that surface, deposited thereon.

As shown in FIG. 9, base, emitter and collector terminals are attached directly to the respective regions of the wafer by fused joints, e.g. by soldering or brazing. The base terminal 52 is a rectangular plate fused to the platelike portion 47 of the base contact and the collector terminal 53 is a rectangular plate fused to the collector contact 51. The emitter terminal 54 comprises two rectangular portions joined along one edge by an integral bridging piece which is fused to the arm of the C-shaped emitter contact 49 while the rectangular portions are fused to the legs of the C-shaped contact 49. These terminals are best seen in FIGS. 9, 10 and 11. The device thus formed can then be encapsulated in a suitable package, and in FIGS. 10 and 11 is shown potted in a suitable insulating plastics material 55, the base emitter and collector terminals projecting through the package to provide electrical accessibility to the transistor.

FIGS. 12 and 13 show an alternative embodiment to that shown in FIGS. 7—11 the semiconductor body including a single base region to which are diffused two spaced rows of emitter stripes. Formation of the emitter, base and collector regions is otherwise similar to that described with reference to FIGS. 7—11 and the description will not be repeated. As shown in FIG. 12, an emitter contact 61 is deposited on the oxide layer 62 overlying the upper surface of the semiconductor body 60. The emitter contact has a flat C-shaped region 63 extending around three sides of the body 60 and contact fingers 64 extend towards each other from the legs of the C-shaped region 63, overlying and contacting the respective emitter stripes through apertures in the oxide layer 62. A base contact 65 is also deposited on the oxide layer 62, having a flat T-shaped region 66 the arm of which extends along the fourth side of the body 60 while the leg extends between the two rows of emitter stripes i.e. between the two rows of emitter contact fingers 64. Base contact fingers 67 project from either side of the leg of the T-shaped region 66, interdigitating with the emitter contact fingers 64 and contacting the base region through apertures in the oxide layer intermediate the emitter stripes.

As shown in FIG. 13 two platelike emitter terminal members 68 are cantilevered from the body 60 and are fused directly to the legs of the C-shaped emitter contact region 63. A platelike base terminal member 69 is also cantilevered from the body 60, and has a projecting finger 70 which overlies the leg of the T-shaped base contact region 66. The base terminal is fused directly to both the arm and the leg of the T-shaped contact region 66.

A platelike collector terminal 71 is directly fused to a collector contact (not shown) deposited over the under surface of the body 60. The formation of the collector contact and terminal is identical to that shown in FIGS. 7—11.

The device thus constructed can then be potted or otherwise encapsulated as described with reference to FIGS. 7—11.

The disposition and formation terminals as shown in FIGS. 7—11 and in FIGS. 12 and 13 facilitates direct connection of the transistor into a strip line system or a rectangular waveguide system, again ensuring a high degree of mechanical and electrical compatibility between the transistor and the circuit of which it forms part.

In the embodiments described with reference to the drawings, the base, emitter and collector contact regions can be formed by evaporating firstly molybdenum and then gold layers over the whole of the appropriate surfaces of the wafer and then, using photographic masking and etching techniques, required portions, of the metal layers are removed from the top wafer surface to form the base and emitter contacts. The base, emitter and collector terminals are suitably made of gold plated copper and fused to the respective contact regions using a gold-indium or gold-germanium solder.

Although the description of the drawings has been in relation to a particular transistor, it will be appreciated the PNP transistors could be used as well as other types of transistors, e.g. field effect transistors. In addition, the invention can be used in conjunction with semiconductor devices other than transistors, e.g. diodes. Further other types of package or encapsulation to those described can be used.

We claim:

1. A semiconductor device comprising a body of semiconductor material including two active regions exposed at a common surface of said body; first and second low resistance deposited contacts overlying the said active regions and making ohmic contact therewith, said contacts including projecting fingers which interdigitate with each other; first and second electrical terminal members having regions overlying and fused directly to the deposited contacts, said first terminal having a platelike portion cantilevered from said body, said second terminal having two electrically connected platelike portions cantilevered from the body in opposite directions, each transversely of said first terminal member; said terminal members extending in sealed relation through a package containing the semiconductor body.

2. A device according to claim 1, in which the first and second terminals are coplanar.

3. A device according to claim 1, in which the body includes a third contact deposited on an opposite surface of the body, and connected by a low resistance path to a third active region of the body, and a third terminal having a platelike portion fused directly to the third contact and cantilevered from the body to extend in an opposite direction to the said first terminal.

4. A device according to claim 3, in which the first and second terminals are base and emitter terminals respectively and the third terminal is a collector terminal connected to a collector region of the body through a low resistance portion of the body.

5. A device according to claim 1, in which the contiguous surfaces of the contacts and the respective terminals are of like composition, and in which those surfaces are fused to each other using a fusing material including material of that composition.